United States Patent
Fletcher

(10) Patent No.: US 8,356,581 B2
(45) Date of Patent: Jan. 22, 2013

(54) FLAME PROOF POWER PACK

(75) Inventor: Stephen Fletcher, Ancaster (CA)

(73) Assignee: Sandvik Mining and Construction Canada, Inc., Lively (CA)

( * ) Notice: Subject to any disclaimer, the term of this patent is extended or adjusted under 35 U.S.C. 154(b) by 661 days.

(21) Appl. No.: 12/594,141

(22) PCT Filed: Mar. 31, 2008

(86) PCT No.: PCT/CA2008/000597
§ 371 (c)(1),
(2), (4) Date: Feb. 2, 2010

(87) PCT Pub. No.: WO2008/119172
PCT Pub. Date: Oct. 9, 2008

(65) Prior Publication Data
US 2010/0132636 A1    Jun. 3, 2010

Related U.S. Application Data

(60) Provisional application No. 60/907,386, filed on Mar. 30, 2007.

(51) Int. Cl.
*F01P 1/06*    (2006.01)

(52) U.S. Cl. .................. 123/41.31; 123/559.1; 123/563; 123/41.01; 60/598; 60/616; 60/320; 60/321; 60/323

(58) Field of Classification Search ............... 123/41.31, 123/41.01, 195 C, 559.1, 563; 60/598, 616, 60/320, 321, 323, 605.1
See application file for complete search history.

(56) References Cited

FOREIGN PATENT DOCUMENTS

| JP | 1024149 A1 | 1/1989 |
|---|---|---|
| JP | 4063910 A1 | 2/1992 |

*Primary Examiner* — Noah Kamen
*Assistant Examiner* — Hung Q Nguyen
(74) *Attorney, Agent, or Firm* — Steven M. Greenberg, Esq.; Carey, Rodriguez, Greenberg & O'Keefe

(57) ABSTRACT

A power pack has an electrically controlled internal combustion engine which is provided with a turbo charger which is immersed in liquid coolant to reduce the risk of a spark therefrom igniting combustible gas in the ambient atmosphere.

5 Claims, 5 Drawing Sheets

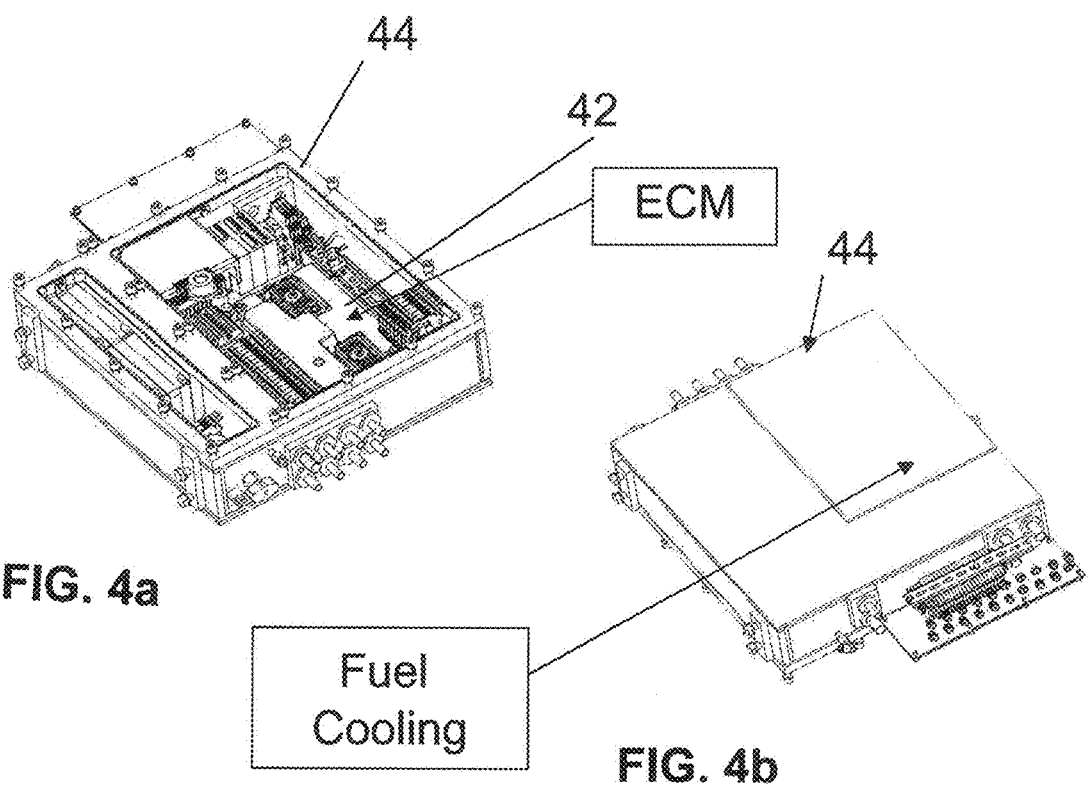

FLAME PROOF POWER PACK

CROSS-REFERENCE TO RELATED APPLICATIONS

This application is the U.S. National Phase under 35 U.S.C. §371 of International Application No. PCT/CA2008/000597, filed on Mar. 31, 2008, which in turn claims the benefit of U.S. Patent Application Ser. No. 60/907,386, filed on Mar. 30, 2007, the disclosures of which Applications are incorporated by reference herein in their entirety.

BACKGROUND OF THE INVENTION

1. Statement of the Technical Field

This invention relates to power packs which include an electrical system and which have to be flame proof so that they can be used safely in an environment where a spark from the power pack may cause an explosion if it is not flame proof. Such conditions may exist for example in a mine such as a coal mine where methane gas is sometimes present and can be ignited by a spark.

2. Description of the Related Art

Present day power packs used in coal mines frequently comprise an electrically controlled diesel engine and it is necessary to ensure that the electrical system is not capable of igniting methane with a spark.

It is therefore an object of the invention to provide a power pack of this kind which is flame proof so that methane in the environment will not be ignited by a spark therefrom.

SUMMARY

According to the invention, a power pack comprising an electrically controlled internal combustion engine is rendered flame proof by effecting one or more of the following features:

(a) providing a liquid immersed turbo charger;
(b) providing a surface temperature controlled filter assembly in the exhaust system;
(c) providing improved cooling for the engine control module; and
(d) providing a cooling circuit to effect cooling of various components.

BRIEF DESCRIPTION OF THE DRAWINGS

One embodiment of the invention will now be described, by way of example, with reference to the accompanying drawings, of which:

FIGS. 4(a) and 4(b) are perspective views of the engine control module.

DETAILED DESCRIPTION OF EMBODIMENTS

Figure 1:
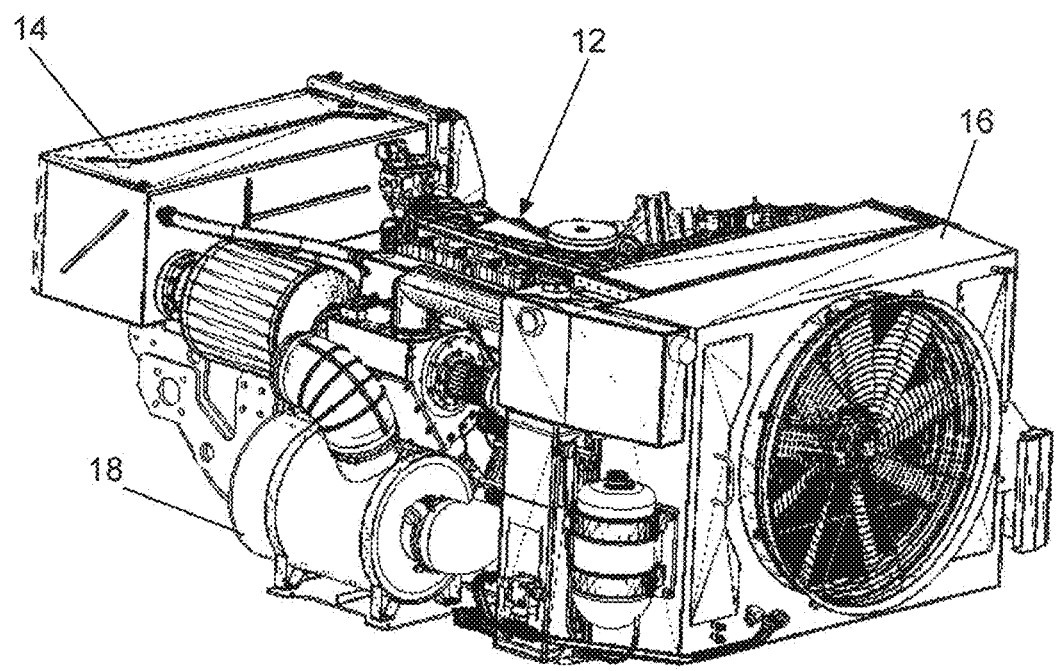
FIG. 1 a flame proof power pack in accordance with one embodiment of the invention.

Referring to the drawing, FIG. 1 shows a perspective view of a flame proof power pack in accordance with one embodiment of the invention. The power pack includes a diesel engine 12, 14, 16 and 18.

Figure 2A:
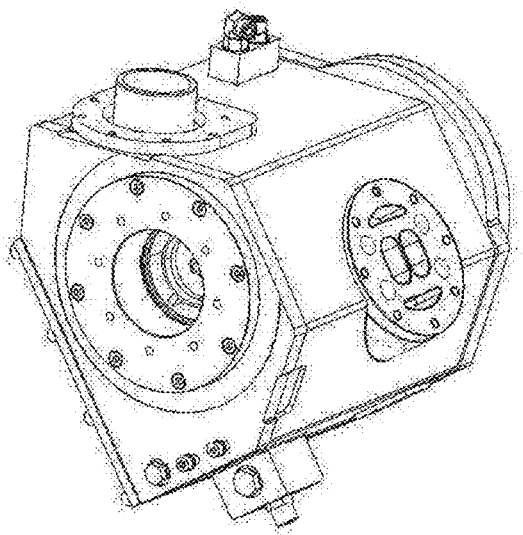
FIGS. 2(a), 2(b) and 2(c) are perspective views of the turbo charger.
Figure 2C:
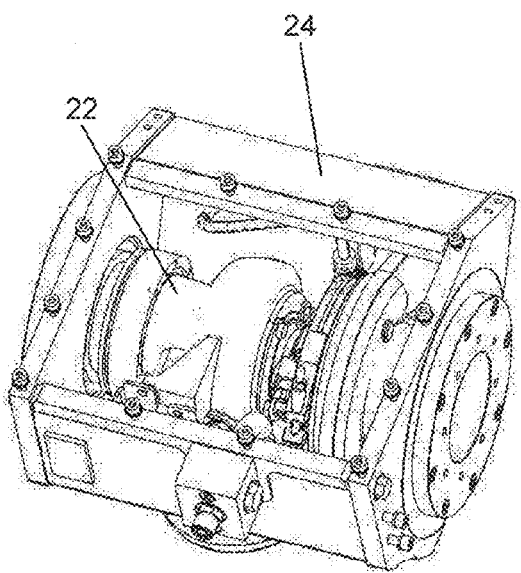
Figure 2B:
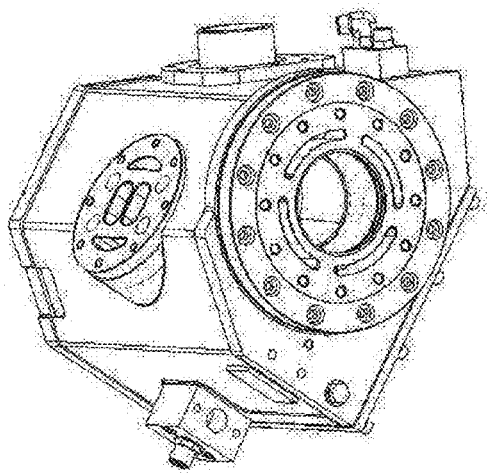

Referring now to FIGS. 2(a), 2(b) and 2(c), the power pack has a turbo charger 22 located in a housing 24, with sealed joints at all connections. The turbo charger 22 is immersed in engine cooling liquid which flows through the housing 24, the housing 24 being secured to a liquid cooled exhaust manifold so as to receive coolant therefrom. The coolant then flows out of the housing 24 through an exhaust fan.

Figure 3A:
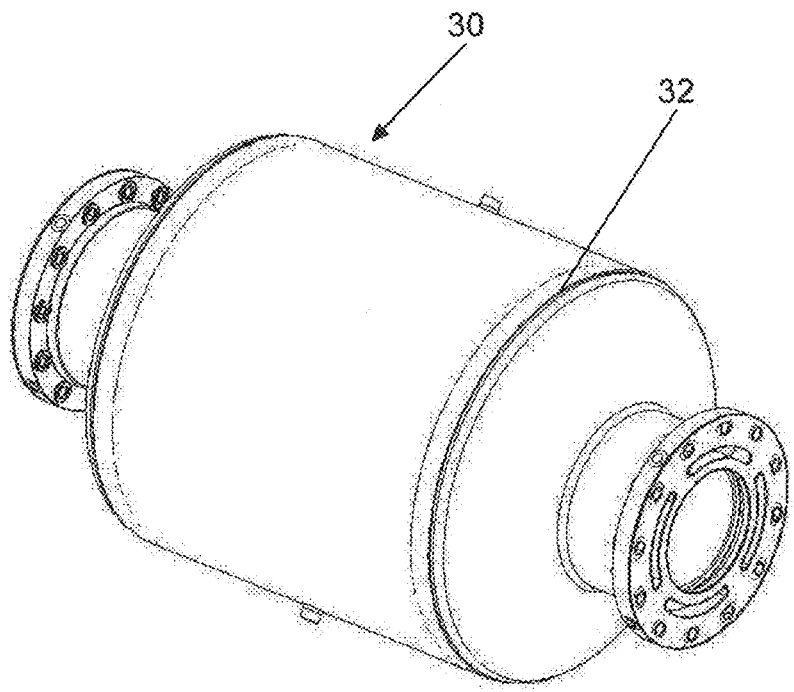
FIGS. 3(a) and 3(b) are perspective views of the exhaust filter.
Figure 3B:
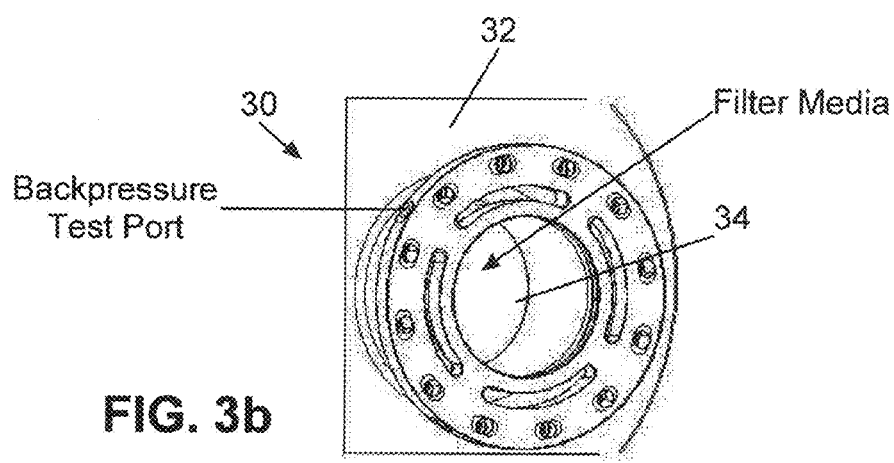

FIGS. 3(a) and 3(b) show an exhaust filter assembly 30 with a housing 32 which is attached to the outlet of the turbo charger exhaust so as to receive the hottest possible gas. FIG. 3(b) shows the filter media 34. The filter assembly 30 is cooled by engine coolant which flows through an end flange into the housing 32. The housing 32 has a double skin, with exhaust on the inside and a 6 to 12 mm film of coolant flowing around the outside to keep the surface temperature below 150° C. (302° F.).

As shown in FIGS. 4(a) and 4(b), the engine control module (ECM) 42 is located in a housing 44, with fuel being routed through the rear of the housing 42. Engine sensors are controlled by the ECM 42 via an electrical circuit namely comprising intrinsically safe (IS) barriers and a PLC with custom software to manipulate signals to correct distortion caused by the IS circuitry. Since starting the diesel engine 12 requires an electrical supply to trigger the fuel injection until the alternator begins to supply power, two small batteries are provided for this purpose.

Figure 5:
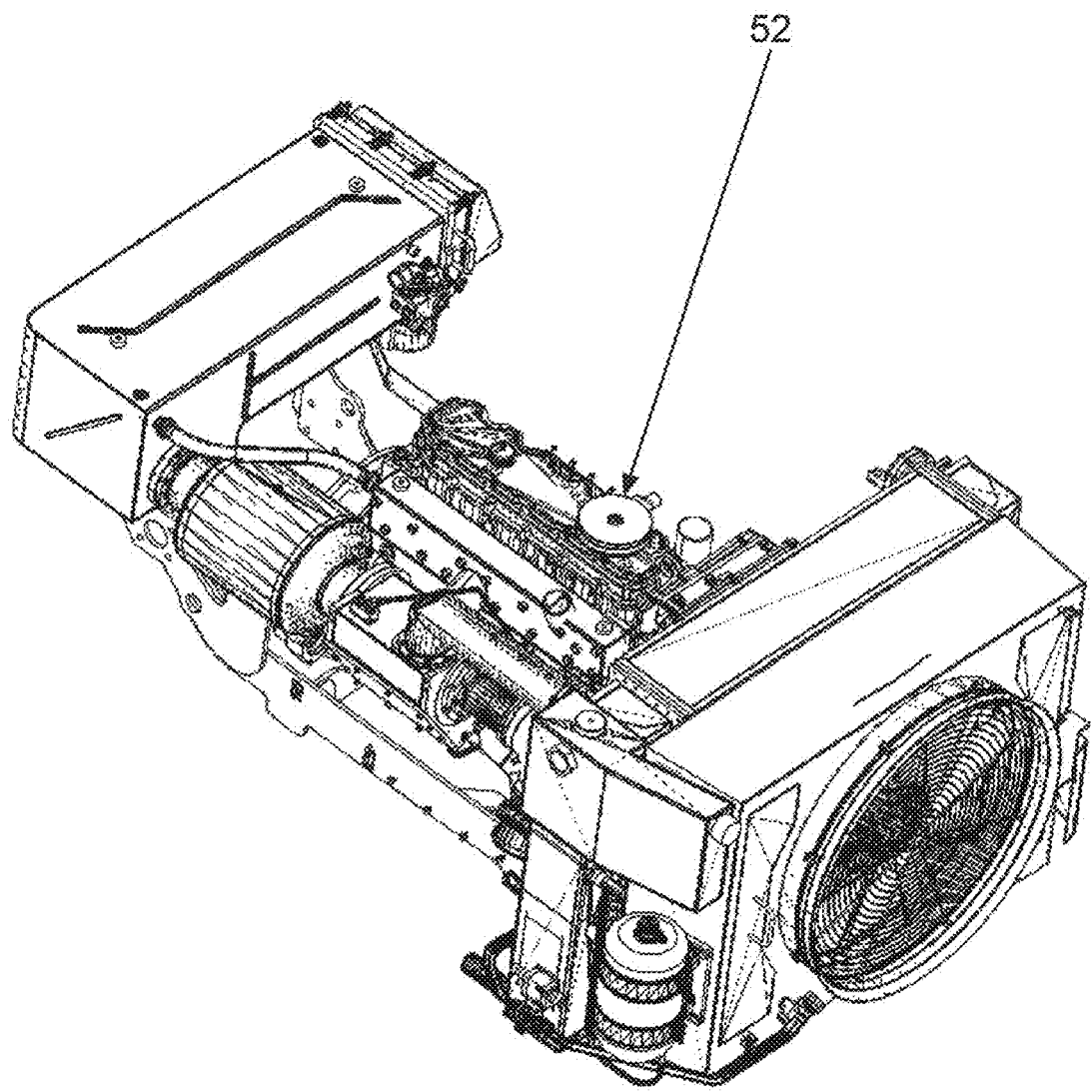
FIG. 5 is a perspective view of the cooling circuit.

FIG. 5 shows the cooling circuit 52 which effects single circuit water cooling of exhaust, surface temperature control of intake and exhaust systems and engine temperature control. The cooling circuit 52 has a single pump which forces engine coolant through the following components in the order listed:

1) engine block/cylinder head;
2) exhaust manifold;
3) turbocharger cooling enclosure;
4) exhaust treatment device (filter or straight tube dependent on requirements);
5) exhaust gas heat exchanger;
6) thermostat housing/thermostat;
7) radiator.

The location of the regulator/thermostat adjacent the end of the system permits a fast engine warm up and also enables the circuit to cool the engine and hottest components with the coolest water available. The circuit uses no flow control devices (orifices) and is vented to permit filling at the engine manufacturer's prescribed rate.

The advantages of the invention and other embodiments thereof will now be readily available to a person skilled in the art from the foregoing description.

I claim:

1. A power pack including an electrically controlled internal combustion engine, characterized in that:
the internal combustion engine (12) is provided with a turbo charger (22) located in a first housing (24) with sealed joints at all connections, the turbo charger (22) being immersed in liquid coolant which flows through the first housing;
the first housing is secured to a liquid cooled exhaust manifold so as to receive liquid coolant therefrom; and
the internal combustion engine is further provided with an exhaust treatment device in communication with an exhaust outlet of the turbo charger so as to receive gas therefrom, the exhaust treatment device being disposed within a second housing (32), the second housing having a double skin and receiving a layer of liquid coolant from the first housing, the layer of liquid coolant flowing between an inner layer and an outer layer of the double skin;

so that, in operation, the surface temperature of the power pack remains below 150 degrees Celsius.

2. A power pack according to claim 1, characterized in that liquid coolant is passed along the following components of the power pack in the order listed, namely the internal combustion engine, the exhaust manifold, the first housing, the exhaust treatment device, an exhaust gas heat exchanger, a thermostat and a radiator.

3. A power pack according to claim 1, wherein the exhaust treatment device comprises a filter assembly.

4. A power pack according to claim 1, wherein the exhaust treatment device comprises a straight tube.

5. A power pack according to claim 1, wherein the double skin is arranged so that the layer of liquid coolant is a film of liquid coolant between 6 mm and 12 mm thick.

* * * * *